United States Patent [19]

Pielartzik et al.

[11] Patent Number: 5,162,434

[45] Date of Patent: Nov. 10, 1992

[54] THERMOPLASTIC BLOCK COPOLYMERS OF VINYL OR VINYLIDENE POLYMER SEGMENTS AND SEGMENTS OF LIQUID CRYSTALLINE POLYMERS

[75] Inventors: Harald Pielartzik, Krefeld; Kurt P. Meurer, Koenigswinter; Rolf-Volker Meyer, Krefeld; Joseph W. Witte, deceased, late of Cologne, by Margarethe H. Witte, Karin Witte, heirs; by Klaus G. Witte, heir, Berlin, all of Fed. Rep. of Germany

[73] Assignee: Bayer Aktiengesellschaft, Leverkusen, Fed. Rep. of Germany

[21] Appl. No.: 565,191

[22] Filed: Aug. 7, 1990

Related U.S. Application Data

[63] Continuation of Ser. No. 309,814, Feb. 13, 1989, abandoned.

[30] Foreign Application Priority Data

Feb. 25, 1988 [DE] Fed. Rep. of Germany ....... 3805856

[51] Int. Cl.$^5$ .................... C08G 81/02; C08G 63/133; C08G 63/64; C08G 69/44
[52] U.S. Cl. .......................................... 525/66; 525/67; 525/68; 525/132; 525/146; 525/184
[58] Field of Search ................. 525/132, 176, 177, 68, 525/66, 67, 146, 148, 183, 184

[56] References Cited

U.S. PATENT DOCUMENTS

| | | | |
|---|---|---|---|
| 4,563,508 | 1/1986 | Cottis | 525/444 |
| 4,667,011 | 5/1987 | Eckhardt | 528/128 |
| 4,798,873 | 1/1989 | Meurer et al. | 525/333.7 |
| 4,804,711 | 2/1989 | Ishihara | 525/146 |
| 4,845,158 | 7/1989 | Peters | 525/354 |

FOREIGN PATENT DOCUMENTS

| | | |
|---|---|---|
| 0248261 | 12/1987 | European Pat. Off. . |
| 0253196 | 1/1988 | European Pat. Off. . |
| 0259868 | 3/1988 | European Pat. Off. . |
| 1521223 | 3/1968 | France . |

OTHER PUBLICATIONS

Billmeyer, Textbook of Polymer Science, p. 312, Wiley-Interscience, N.Y. (1971).

M. Gervais et al., Makromol. Chem., 182:989–995 (1981).

Primary Examiner—Patricia Short
Attorney, Agent, or Firm—Connolly and Hutz

[57] ABSTRACT

The thermoplastic block copolymers according to the invention of optionally substituted vinyl or vinylidene polymer segments and segments of liquid crystalline polymers are suitable for use as compatibility improvers or dispersing agents in otherwise incompatible or poorly compatible thermoplastic polymer mixtures and may be used for the production of moulded articles, filaments, fibres and films.

3 Claims, No Drawings

THERMOPLASTIC BLOCK COPOLYMERS OF VINYL OR VINYLIDENE POLYMER SEGMENTS AND SEGMENTS OF LIQUID CRYSTALLINE POLYMERS

This application is a continuation of application Ser. No. 309,814, filed Feb. 13, 1989, now abandoned.

This invention relates to thermoplastic block copolymers of optionally substituted vinyl or vinylidene polymer segments and segments of liquid crystalline polymers.

Liquid crystalline homopolymers are known in the art (e.g. A. Cifferi in W. R. Krigbaum, R. B. Mayer, Polymer Liquid Crystals, Academic Press, 1982: J. Preston in A. Blumstein. Liquid Crystalline Order in Polymers, Academic Press, 1978).

Substances are described as "thermotropic" or "liquid crystalline" if they form liquid crystalline melts. Thermotropic polycondensates are well known, see e.g.:

F. E. McFarlane et al, Liquide Crystal Polymers II, Contemporary Topics in Polymer Science. Vol.2, Plenum Publishing Corporation, 1977;

W. J. Jackson and H. F. Kuhfuss, J. Polymer, Polymer Chem. Ed. 14, 2042 (1976);

W. C. Wooten et al in A. Cifferi, "Ultra-high Modules Polymers", Applied Science Publ,. London 1979, pages 362 et seq;

A. Blumstein et al, "Liquid Crystalline Order in Polymers", Academic Press, 1978:

J. Preston, Angew. Makromol. Chem. 109/110, pages 1-19 (1982);

A. Cifferi, W. R. Krigbaum and R. B. Meyer "Polymer Liquid Crystals", Academic Press, New York, 1982;

EP 1185, 1340, 8855, 11 640, 15 856, 17 310, 18 145, 18 709, 22 344, 44 205 and 49 615; U.S. Pat. No. 39 91 013, 39 91 014, 40 66 620, 40 67 852, 40 83 829, 41 07 143, 42 26 970, 42 32 143, 42 32 144, 42 45 082, 42 69 965, 43 35 232, 43 81 389, 43 99 270, 43 98 015, 44 47 592 and 45 00 699;

JP 59/1 26 431; and

WO 79/792, 79/1 030 and 79/1 040.

The liquid crystalline state of polymer melts may be investigated with a polarization microscope. For the investigations carried out, the eyepiece was equipped with an attachment containing a photoelectric diode at the focal point of the lens. A measuring amplifier with control device arranged in series with this attachment was used to adjust the measured value obtained in the absence of a sample of material when the microscope was switched on with the Nicol prisms arranged in parallel to 100 scale divisions. The value obtained when the Nicol prisms were crossed was then 0.01 scale divisions.

Investigation of the polycondensates was carried out after the samples had been melted at temperatures of from 280° to 400° C. If the melt between the crossed Nicol prisms was observed to brighten over all or part of this temperature range, the polycondensate was graded as thermotropic and liquid crystalline.

The liquid crystalline polycondensates give values of more than 1 scale division in the measuring arrangement, in most cases values of from 3 to 90 scale divisions. For amorphous melts, on the other hand, such as aromatic polycarbonates, values of less than 0.1 scale division were found.

The method described above is particularly suitable for rapid determination in the laboratory and gives unequivocal results in almost all cases. In cases of doubt, however, it may be advisable to confirm the presence of liquid crystalline components in the melt by X-ray wide angle scattering as described e.g. in "Plastic Crystals, Physico-Chemical Properties and Methods of Investigation" by G. W. Gray and P. A. Windsor, in particular Chapter 3, John Wiley and Sons, New York, Sydney, Toronto, 1974.

Blends of vinyl polymers and liquid crystalline polymers prepared by physical mixing are known from European Patent Specification 00 30 417. The blends described in the said European Patent Specification are physical mixtures of the components, as already mentioned, i.e. they have no covalent bonds between the polyolefines or aromatic polyvinyl compounds and the segments of the liquid crystalline polymers. It is therefore not possible to prevent a fundamental incompatibility between these widely differing polymer components. This manifests itself, for example, in the unsatisfactory mechanical properties of such mixtures, as our own experiments have shown.

The present invention relates to thermoplastic moulding compounds of

A) optionally substituted polyolefines or aromatic polyvinyl compounds and

B) liquid crystalline polymers in which components A) and B) are present as block condensates.

In the thermoplastic moulding compounds according to the invention, the optionally substituted polyolefine blocks, the aromatic polyvinyl blocks and the blocks of liquid crystalline polymers are covalently linked by ester or amide groups. Linking of the blocks with components A) and B) is carried out by reacting carboxyl-containing, optionally substituted vinyl polymers having a molecular weight ((Mw) of from 1000 to 350,000, preferably from 5000 to 200,000, in particular from 10,000 to 100,000, with the blocks of liquid crystalline polymers or with the monomer units required for the synthesis of the liquid crystalline polymers under suitable reaction conditions so that a covalent bond between the vinyl polymer blocks and the blocks of liquid crystalline polymers will be formed. The proportion by weight of the polyolefine or aromatic polyvinyl blocks in this procedure is from 3 to 97% and the proportion by weight of the blocks of liquid crystalline polymers is from 97 to 3%, based on the total weight of the blocks. The proportion by weight of the polyolefine or aromatic polyvinyl blocks is preferably 5 to 70% and that of the blocks of liquid crystalline polymers form 95 to 30%

The thermoplastic moulding compounds according to the invention are block polymers of differing structures. They may be build up, for example, of blocks having the structures AB, ABA, BAB and (AB)$_x$, where x stands for a number greater than 1, preferably from 2 to 100 (A: vinyl polymer and vinylidene polymer segments, B: segments of liquid crystalline polymers).

Vinyl polymers which are used as component A) for the thermoplastic moulding compounds according to the invention and which are functionalized by a carboxyl or carboxylic acid anhydride group are known in the art (see DE-OS 3 618 378).

Aliphatic polyolefines containing carboxyl or carboxylic acid ester anhydride groups may be prepared by subjecting high molecular weight, non-functional aliphatic polyolefines to a grafting reaction with unsaturated carboxylic acids or carboxylic acid anhydrides such as maleic acid anhydride or by subjecting the high molecular weight, non-functional polyolefines to an oxidative degradation with air, oxygen or ozone. Thus according to U.S. Pat. Nos. 3,416,990, 3,437,550 and 3,483,276, polypropylenes containing carboxylic acid groups may be obtained by modifying crystalline or amorphous polypropylene with an ethylenically unsaturated carboxylic acid, a polycarbodylic acid or an unsaturated carboxylic acid ester.

An example of a crystalline, carboxylated polypropylene polymer which may be used according to the invention is Hercoprime ® G obtainable by Hercules, Inc. Bloomington, Del. 19899.

An example of an amorphous carboxylated polypropylene polymer is Epolene ® E 43 obtainable from Tennessee-Eastman Company, Tennessee.

Another method of obtaining polyolefines containing carboxyl or carboxylic acid anhydride groups is described in German Offenlegungsschrift 3 618 378. Suitably functionalized polypropylene carboxylic acids and polypropylene dicarboxylic acids may be obtained by the method described there.

Aromatic polyvinyl compounds containing carboxyl or carboxylic acid anhydride groups may be prepared by ionic or radical polymerisation. Suitable methods are described in the literature and known to the man of the art: see also Houben-Weyl, Methoden der org. Chemie, Volume 14/1, J. Thieme Verlag, 1961.

Monofunctional aromatic polyvinyl anions having a narrow molecular weight distribution are known (see L. J. Fetters, Rubber Chem. Technol, 48, (1975), page 359).

Bifunctional aromatic polyvinyl anions are also known and are described by F. Bendermann in Makromol. Chem. 186, (1985), pages 2017-2024 and in U.S. Pat. No. 1,505,460.

Poly-arylolefine-mono- and di-carboxylic acids, particularly polystyrene mono- and di-carboxylic acids are generally prepared by anionic polymerisation followed by carboxylation of the reaction solution (see D. P. Wyman, V. R. Allen, T. Altares, Jr., J. Polym, Sci.: Parta Vol. 2, 4245-4550 (1964); R. P. Quirk, W.-C. Chen, Macromol. Chem 1982 III, 189 (9), 2071-2076; see also Houben Weyl, Methoden der Org. Chemie, 4th Edition, Makromolekulare Stoffe I, 761 et seq (1961)).

The vinyl polymers used as component A) generally have a molecular weight of from 1008 to 350,000, preferably from 2000-800,000, most preferably from 4000-100,000. The carboxyl group content is about 0.7 to 2.5 carboxyl groups per molecule, preferably from 1.5 to 2 carboxyl groups per molecule.

The following optionally substituted vinyl polymers may be used as component A) according to the invention: Polyolefines such as polyethylene, polypropylene or polybutylene or aromatic polyvinyl compounds such as polystyrene, poly-α-methylstyrene or polymethylstyrene, preferably polypropylene and polystyrene.

The liquid crystalline polymers used as component B) in the thermoplastic moulding compounds according to the invention are preferably fully aromatic polyesters, polycarbonates or polyester amides (see L. L.Chapoy, Recent Advances in LC-polymers, Elsevier App. Sci. Publ. 1985).

The liquid crystalline polymers may be built up from the following monomeric units:

a) aromatic hydroxycarboxylic acids,
b) aromatic aminocarboxylic acids,
c) diphenols,
d) aminophenols,
e) aromatic dicarboxylic acids and
f) optionally carbonic acid or derivatives thereof.

Compounds corresponding to the following formulae are examples of suitable aromatic hydroxycarboxylic acids a):

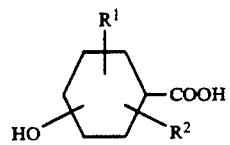

and

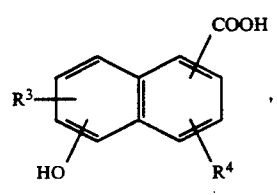

In the above forumlae, $R^1$ to $R^4$ denote $C_1$-$C_4$-alkyl (preferably methyl, ethyl), $C_1$-$C_4$-alkoxy (preferably methoxy, ethoxy), $C_6$-$C_{10}$-aryl or aryloxy (preferably phenyl, phenyloxy, naphthyl, naphthyloxy, biphenyl, biphenyloxy, tolyl or tolyloxy), $C_7$-$C_{12}$-alkylaryl (preferably benzyl), halogen (preferably chlorine or bromine) or hydrogen, and the valencies enclose an angle of from 45° to 180° between the nucleus and the carboxyl group.

The following are examples of preferred aromatic hydroxycarboxylic acids (a):

4-Hydroxy-3-methylbenzoic acid, 4-hydroxy-3-phenylbenzoic acid, 4-hydroxy-2-ethylbenzoic acid, 3-chloro-4-hydroxybenzoic acid, 3-bromo-4-hydroxybenzoic acid, 4-hydroxy-3-methoxybenzoic acid, 4-hydroxybenzoic acid, 6-hydroxy-naphthoic acid, 4-hydroxy-3-pheroxybenzoic acid, 6-hydroxy-5-chloro-2-naphthoic acid, 6-hydroxy-5-methyl-2-naphthoic acid, 6-hydroxy-5-methoxy-2-naphthoic acid, 6-hydroxy-4,7-dichloro-2-naphthoic acid and 2-hydroxybenzoic acid. b 4-Hydroxybenzoic acid and 6-hydroxynaphthoic acid are particularly preferred.

The following are given as examples of optionally substituted 3-hydroxybenzoic acids (e): 3-Hydroxy-4-methylbenzoic acid, 3-hydroxy-4-phenylbenzoic acid, 3-hydroxy-2-ethylbenzoic acid, 4-chloro-3-hydroxybenzoic acid, 4-bromo-3-hydroxybenzoic acid, 3-hydroxy-4- methoxybenzoic acid, 3-hydroxy-4-phenoxybenzoic acid, 3-hydroxy-2-methoxybenzoic acid and 3-hydroxybenzoic acid.

Unsubstituted hydroxycarboxylic acids such as 3-hydroxybenzoic acid are particularly preferred aromatic 3-hydroxycarboxylic acids (e).

Compounds corresponding to the following formulae are examples of suitable aromatic aminocarboxylic acids (b):

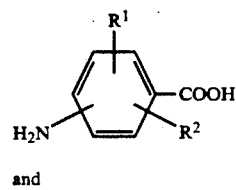

and

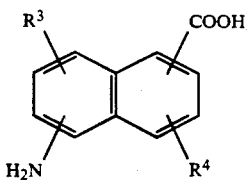

(IV)

In the above formulae, $R^1$ to $R^4$ denote $C_1-C_4$-alkyl (preferably methyl or ethyl), $C_1-C_4$-alkoxy (preferably methoxy or ethoxy), $C_6-C_{10}$-aryl or aryloxy (preferably phenyl, phenyloxy, naphthyl, naphthyloxy, biphenyl, biphenyloxy, tolyl or tolyloxy), $C_7-C_{12}$-alkylaryl (preferably benzyl), halogen (preferably chlorine or bromine) or hydrogen and the valencies enclose an angle of from 45° to 180° between the nucleus and the hydroxyl group and between the nucleus and the carboxyl group.

The following are preferred aromatic amino carboxylic acids: 2-Aminobenzoic acid, 3-aminobenzoic acid, 4-aminobenzoic acid, 4-chloranthranilic acid, 5-chloranthranilic acid, 3-amino-4-chlorobenzoic acid, 3-amino-4-methylbenzoic acid, 4-amino-3-methylbenzoic acid, 4-amino-3-phenylbenzoic acid, 3-bromo-4-aminobenzoic acid, 4-amino-3-methoxybenzoic acid, 6-aminonaphthoic acid, 4-amino-3-phenylbenzoic acid, 6-amino-5-chloro-2-naphthoic acid, 6-amino-5-methyl-2-naphthoic acid, 6-amino-5-methoxy-2-naphthoic acid and 6-amino-4,7-dichloro.2-naphthoic acid. 4-Aminobenzoic acid and 6-aminonaphthoic acid are particularly preferred. 4-Aminobenzoic acid, 3-aminobenzoic acid and 6-amino-2naphthoic acid are particularly preferred aromatic amino-carboxylic acids.

The diphenols c) may be compounds corresponding to the following formula $$HO-Z-OH \qquad (V)$$

wherein

Z denotes a divalent mononuclear or polynuclear aromatic group containing 6 to 30 carbon atoms and having the two OH groups directly attached each to a carbon atom of an aromatic system, the two valencies enclosing an angle of from 45° to 180°.

The aromatic groups may be substituted by 1 to 4 $C_1-C_4$-alkyl, $C_1-C_4$-alkoxy or phenyl, phenoxy, benzyl or halogen groups (preferably chlorine or bromine) and include not only phenylene, naphthylene and biphenylene but also phenylene groups connected by oxygen, sulphur, carbonyl, sulphonyl, $C_1-C_4$-alkylene or alkylidene, cyclohexylene or hexylidene or $-O(CH_2)_nO-$ where n=2 to 4.

The following are examples of preferred diphenols b): Hydroquinone, 4,4'-dihydroxydiphenyl, 4,4,-dihydroxydiphenylether, 4,4'-dihydroxydiphenylethane, 4,4'-dihydroxydiphenoxyethane, 3,5'-dihydroxydiphenyl, 3,5'-dihydroxydiphenylether, 1,5-dihydroxynaphthalene, 2,6-dihydroxynaphthalene, 1,4-dihydroxynaphthalene, chlorohydroquinone, bromohydroquinone, methylhydroquinone, phenylhydroquinone, ethylhydroquinone, 2,2'-dimethyl-4,4'-dihydroxydiphenyl, 3,3', 5,5'-tetramethyl-4,4'-dihydroxydiphenyl, 3,5'-dimethoxy4,4'-dihydroxydiphenylether, 1,2-(2-chloro-4-hydroxyphenoxy)ethane, 4-methoxy-2,6-dihydroxynaphthalene, resorcinol, 3,4'-dihydroxydiphenyl, 3,4'-dihydroxydiphenylether, 3,4'-dihydroxydiphenoxyethane, 1,3-dihydroxynaphthalene, 1,6-dihydroxynaphthalene, 1,7-dihydroxynaphthalene, 2,7-dihydroxynaphthalene, 4-chlororesorcinol, 4-bromoresorcinol, 4-methylresorcinol, 4-phenylresorcinol, 4-ethoxyresorcinol, 2,5-dichloro-1,6-dihydroxynaphthalene and 4-methoxy-2,7-dihydroxynaphthalene.

Hydroquinone and 4,4'-dihydroxydiphenyl are particularly preferred diphenols b).

Compounds corresponding to the following formula are suitable aminophenols d):

$$HO-Z-NH_2 \qquad (VI)$$

wherein

Z denotes a divalent mononuclear or multinuclear aromatic group containing 6 to 30 carbon atoms and of such a structure that both OH groups are directly attached each to a carbon atom of an aromatic system, the two valencies enclosing an angle of 45° to 180°.

The aromatic groups may be substituted by 1 to 4 $C_1-C_4$ alkyl, $C_1-C_4$-alkoxy, phenyl, phenoxy, benzyl or halogen groups (preferably chlorine or bromine) and include not only phenylene, naphthylene and biphenylene but also phenylene groups connected by oxygen, sulphur, carbonyl, sulphonyl, $C_1-C_4$-alkylene or alkylidene, cyclohexylene or hexylidene or $-O(CH_2)_nO-$ where n=2-4.

The following are preferred aminophenols: 3-Aminophenol, 5-amino-2-chlorophenol, 4-aminophenol, 3-amino-2-methylphenol, 3-amino-4-methylphenol, 5-amino-1-naphthol, 6-amino-1-naphthol, 5-amino-2-naphthol, 7-amino-2-naphthol, 8-amino-2-naphthol, 6-amino-2-naphthol and 4-amino-1-hydroxybiphenyl.

The aromatic dicarboxylic acids e) may be compounds corresponding to the following formula $$HOOC-A-COOH \qquad (VII)$$

wherein

A denotes a bivalent aromatic group containing 6 to 24 carbon atoms, preferably 6 to 16 carbon atoms, and the two valencies enclose an angle of from 45° to 180°. The bivalent aromatic groups may be substituted by 1 to 4 $C_1-C_4$-alkyl, $C_1-C_4$-alkoxy, phenyl, phenoxy, benzyl or halogen groups (preferably chlorine or bromine) and include not only phenylene, naphthylene and biphenylene but also phenylene groups connected by oxygen, sulphur, carbonyl, sulphonyl, $C_1-C_4$-alkylene or alkylidene, cyclohexylene or hexylidene or $-O(CH_2)_nO-$ where n=1 to 4.

The following are examples of preferred aromatic groups: 1,4-Phenylene, 1,4-naphthylene and 4,4'-biphenylene in which the two bonds extend coaxially in opposite directions, 1,5-naphthylene, 1,6-naphthylene and 3,5'-biphenylene in which the two bonds extending in opposite directions are shifted parallel to one another, and 1,3-phenylene, 1,3-, 1,6-, 1,7- and 2,7-naphthylene and 3,4'-biphenylene, in which the two bonds are not localised on adjacent atoms and do not extend in opposite directions with a coaxial or parallel shift.

The following are examples of preferred aromatic dicarboxylic acids e): 1,4-Naphthalene dicarboxylic acid, 1,5-naphthalene dicarboxylic acid. 2,6-naphthalene dicarboxylic acid, biphenyl-4,4'-dicarboxylic acid, biphenyl-3,3'-dicarboxylic acid, diphenoxyethane-4,4'-dicarboxylic acid, diphenylether-4,4'-dicarboxylic acid, methylterephthalic acid, methoxyterephthalic acid, chloroterephthalic acid, 4-chloronaphthalene-2,7-dicarboxylic acid, 1,3-naphthalene dicarboxylic acid, 1,6- naphthalene acid, 1,7-naphthalene dicarboxylic acid, 2,7-naphthalene dicarboxylic acid, biphenyl-3,4'-dicarboxylic acid, diphenylether-3,4'-dicarboxylic acid, 4-methylisophthalic acid, 5-methylisophthalic acid, diphenylether-4,4'-dichloro-3,3'-dicarboxylic acid and iso- and terephthalic acid.

Iso- and terephthalic acids are particularly preferred aromatic dicarboxylic acids e).

The following are mentioned as derivatives for the incorporation of the f) carbonate groups: Diarylcarbonates such as diphenylcarbonate, ditolylcarbonate, phenyl-tolylcarbonate and dinaphthylcarbonate, dialkylcarbonates such as diethylcarbonate, dimethylcarbonate, dimethyldicarbonate and diethyldicarbonate and glycol carbonate.

Diphenylcarbonate is a preferred derivative for the incorporation of the f) carbonate groups.

The polyester carbonates according to the invention may contain H, OH, $OC_6H_5$ or groups derived as chain breaking agents as end groups.

Methods for the preparation of liquid crystalline polymers (LCP) are described in the Patent literature. Liquid crystalline polyesters and polyester amides are prepared by solvent-free trans-esterification by the acetate process, conventionally carried out as a single stage or two-stage process: EP 0 102 719 and 134 204; U.S. Pat. No. 520,043 and 468,240, and EP 63 880 and 67 032. LC polyesters and polyester carbonates may also be prepared by solvent-free transesterification by the phenyl ester process: U.S. Pat. No. 4,371,600 and 4,435,561. EP 0 015 856 and 132 637 and DE 2 704 315.

The thermoplastic block copolymers according to the invention are condensed in the form of blocks, as already mentioned above, by the reaction of optionally substituted vinyl polymers containing carboxyl groups or carboxylic acid anhydride groups with the liquid crystalline polymers. Instead of using liquid crystalline polymers, the corresponding functionalised vinyl polymers may be condensed with the monomeric units of the liquid crystalline polymers. The condensation reaction links the polyolefine segments with the segments of liquid crystalline polymers by way of phenolic OH groups as esters or by way of NH groups as amide groups.

Linkage of the blocks A and B by ester or amide groups is carried out by condensation processes in which polyvinyl-LC-polyester and polyvinyl-LC-polyester amide block copolymers are preferably prepared by the solvent-free acetate esterification process, either from the monomer units or from previously prepared oligomers.

Polyvinyl-LC-polyester carbonate and polyvinyl-LC-polyester block cocondensates are prepared by solvent-free trans-esterification by the diphenylcarbonate process from suitable monomer units by way of the phenyl esters which are formed in situ or they are prepared from preformed phenyl esters.

Previously prepared oligo ester or oligo ester carbonate segments may also be used.

Furthermore, the solvent-free trans-esterification of high molecular weight LC-polymers with suitable polyvinyl segments may be carried out in an extruder.

Condensation of the blocks A with blocks B may be carried out at temperatures from 100° to 350° C., preferably at 200° to 330° C.

Conventional catalysts for the preparation of polycondensates (see e.g. EPO 0 132 637) may be added in quantities of from 0.0005 to 5%, based on the total quantity of starting components.

The thermoplastic moulding compounds according to the invention may form anisotropic melts when heated. This may have an advantageous effect on their use, e.g. when they are mixed with other polymers. The thermoplastic moulding compounds according to the invention vary in their spectra of properties according to the block length and block content. Thus block cocondensates according to the invention having a great vinyl polymer block length (corresponding to a high molecular weight) and containing a high proportion of vinyl polymer sequences have properties resembling those of vinyl polymers, and the fluidity, notched impact strength and dimensional stability under heat is increased by the incorporation of about 3 to 30% of blocks of liquid crystalline polymers. A particularly marked structural viscosity characterises thermoplastic moulding compounds according to the invention which contain about 30 to 60% of polyolefine blocks and about 40 to 70% of blocks of liquid crystalline polymers.

The thermoplastic moulding compounds according to the invention may be used as compatibility improvers or dispersing agent in otherwise incompatible or poorly compatible thermoplastic polymer mixtures such as polypropylene/LCP blends.

The action of the thermoplastic moulding compounds according to the invention as polymer dispersers is also evident when polypropylene/LCP blends are observed under an optical light microscope. These blends show an irregular distribution composed of units of varying sizes when used without polymer dispersers but the phases are found to become uniform and reduced in size when about 10% of the thermoplastic moulding compounds according to the invention are added.

The thermoplastic moulding compounds according to the invention containing about 97 to 70% of blocks of liquid crystalline polymers are found to have a particularly high capacity for recrystallisation when processed from the melt. The fluidity of the products is satisfactory so that the products are also capable of filling complex moulds.

The thermoplastic moulding compounds according to the invention may also be used for the manufacture of electrotechnical articles such as insulators, printed circuits, plug-and-socket connections, parts of fittings, and coverings of integrated circuits, parts of industrial chemical apparatus such as pipes, container linings, rotors, sliding bearings or seals.

parts for the internal fittings of aircraft and parts of medical technical apparatus, air conditioning plants and valves.

The thermoplastic moulding compounds according to the invention may also be used as covering or coating materials (pulverulent or dispersed). They are also suitable for the preparation of reinforced or filled moulding compounds containing about 5 to 75% by weight of reinforcing agents or fillers, based on the reinforced or filled moulding compounds.

The invention further relates to the use of the new thermoplastic moulding compounds for the production of moulded articles, filaments, fibres and films.

Preparation of the poly-α-alkyl-olefine blocks

Preparation of the polypropylene (PP) carboxylic acids (according to German Offenlegungsschrift 36 18 378)

6000 g/h of isotactic polypropylene having an average molecular weight of 340,000 are introduced into an extruder (ZSK 32) having a length/diameter ratio of LD=40, heated to 250° to 260° C. and mixed with 1500 Nl/h of air under pressure (Nl/h=normal litres per hour).

Downstream of the zone of introduction of air, the cylinder temperature of the extruder is maintained at 210° C. The excess air leaves in the degasification zone and the degraded polypropylene is spun off at the nozzle. Carboxy-functionalised polypropylene having a molecular weight of about 70,000 and a functionality of about 2 is obtained. The acid number is therefore above 1.5 mg KOH/g substance.

Preparation of the PP-carboxylic acid phenyl ester 600 g of Diphenylcarbonate, 420 g of a carboxy functionalised polypropylene (Mw 70,000: acid number about 1.5) and 2.6 g of imidazole are stirred at 180° C. until evolution of $CO_2$ ceases. The reaction temperature is raised to 250° C. for 30 minutes. After the melt has cooled to 160° C., the phenyl ester is precipitated by introduction into 4 l of methanol. suction filtered, washed free from phenol and dried.

General method of experimental procedure for the preparation of carboxymonofunctional polystyrene carboxylic acids Example of a formulation (Molecular weight = 2000)
Autoclave 40 l; N₂; RT

| | | |
|---|---|---|
| Cyclohexane | [ml] | 18000 ($H_2O$ content < 2 ppm) |
| Styrene | [ml/g/mol] | 1584/1440/13.8 |
| THF | [ml] | 1500 ($H_2O$ content < 2 ppm) |
| Temp. | [°C.] | 0 |
| Buli | [ml/mmol] | 276.8/692 (diluted with 500 ml of cyclohexane) |
| Reaction time | [h] | 2 |
| $CO_2$ | [bar] | 10 (autoclave) |
| Reaction time with $CO_2$ | [min] | 15 |
| $CH_3COOH/H_2O$ | [ml/ml] | 500/1000 |

Example of a formulation (Molecular weight = 5000)
Autoclave 40 l; N₂; RT

| | | |
|---|---|---|
| Cyclohexane | [ml] | 18000 ($H_2O$ content < 2 ppm) |
| Styrene | [ml/g/mol] | 1584/1440/13.8 |
| THF | [ml] | 1500 ($H_2O$ content < 2 ppm) |
| Temp. | [°C.] | 0 |
| Buli | [ml/mmol] | 115.2/288 |
| Reaction time | [h] | 2 |
| $CO_2$ | [bar] | 10 (autoclave) |
| Reaction time with $CO_2$ | [min] | 15 |
| $CH_3COOH/H_2O$ | [ml/ml] | 240/500 |

Example of formulation (molecular weight = 10,000)
Autoclave 40 l; N₂; RT

| | | |
|---|---|---|
| Cyclohexane | [ml] | 18000 ($H_2O$ content < 2 ppm) |
| Styrene | [ml/g/mol] | 1584/1440/13.8 |
| THF | [ml] | 1500 ($H_2O$ content < 2 ppm) |
| Temp. | [°C.] | 0 |
| Buli | [ml/mmol] | 57.6/144 |
| Reaction time | [h] | 2 |
| $CO_2$ | bar | 10 (autoclave) |
| Reaction time with $CO_2$ | [min] | 15 |
| $CH_3COOH/H_2O$ | [ml/ml] | 120/500 |

General experimental procedure for the preparation of carboxydifunctional polystyryl carboxylic acid Example of a formulation (bifunctional) Molecular weight = 14000)
Flask 0.5 l; N₂; RT

| | | |
|---|---|---|
| THF | [ml] | 300 |
| α-methylstyrene | [ml/g/mol] | 60/54.8/0.463 |
| Temp. | [°C.] | −40 |
| Na naphthenate | [ml/mmol] | 17.4 |
| Reaction time | [h] | 1 |
| Introduction of $CO_2$ | [min] | 10 |
| Reaction time with $CO_2$ | [min] | 30 |
| 0.2N HCl | [ml] | 100 |

EXAMPLE 1

Preparation of polypropylene/liquid crystalline (LG) polyester block copolymers

The substances summarized in Table 1 and 0.1 g of magnesium acetate (anhydrous) and 0.15 g of antimony trioxide were weighed into a 1 l ground glass vessel equipped with ground glass cover, stirrer, nitrogen inlet and distillation attachment connected to a condenser.

The reaction mixture was heated to 170° C. in a salt bath under a nitrogen atmosphere. As soon as the distillation of acetic acid slowed down (after about 45 minutes), the temperature in the reaction vessel was raised to 250° C. in the course of one hour and to 330° C. in the course of a further hour. After distillation had terminated, the pressure was lowered to about 1 mbar in the course of 30 minutes.

The viscosity of the resulting polymer melt rose sharply during this vacuum phase. The melt was therefore stirred more slowly. At the end of this phase, the total quantity of acetic acid (containing the remainder of acetic anhydride) had been collected.

The light brown products obtained were ground and subjected to a solid phase after-condensation at 250° C. (under a vacuum of about 1 mbar/24 hours. An optically anisotropic melt phase was observed in the region of from 250° to 350° C.

TABLE 1

| | |
|---|---|
| 1a) | 296.30 g of p-hydroxybenzoic acid |
| | 109.0 g of hydroquinone |
| | 30.7 g of 4,4'-dihydroxydiphenyl |
| | 191.40 g of isophthalic acid |
| | 454.80 g of acetic anhydride |
| | 60.86 g of carboxylated polypropylene, molecular weight 70,000, acid number 1.5 |
| 1b) | 296.30 g of p-hydroxybenzoic acid |
| | 109.00 g of hydroquinone |
| | 30.7 g of 4,4'-dihydroxydiphenyl |
| | 190.8 g of isophthalic acid |
| | 454.8 g of acetic anhydride |
| | 136.90 g of carboxylated polypropylene, molecular weight 70,000, acid number 1.5 |
| 1c) | 296.30 g of p-hydroxybenzoic acid |
| | 109.0 g of hydroquinone |
| | 30.7 g of 4,4'-dihydroxydiphenyl |
| | 190.04 g of isophthalic acid |
| | 234.70 g of carboxylated polypropylene, molecular weight 70,000, acid number 1.5 |
| | 454.8 g of acetic anhydride |

EXAMPLE 2

Method of preparation of polypropylene/LC-polyester amide block copolymers

The substances summarized in Table 2 and 0.1 g of magnesium acetate (anhydrous) and 0.15 g of antimony trioxide were weighed into a 1 l ground glass vessel equipped with ground glass cover, stirrer, nitrogen inlet and a distillation attachment connected to a condenser.

The reaction mixture was heated to 170° C. in a salt bath under a nitrogen atmosphere. As soon as the distillation of acetic acid slowed down (after about 45 minutes), the temperature in the reaction vessel was raised to 250° C. in the course of one hour and to 330° C. in the course of a further hour. After distillation had terminated, the pressure was lowered to about 1 mbar in the course of 30 minutes.

The viscosity of the resulting polymer melt rose sharply during this vacuum phase. The melt was therefore stirred more slowly. The total quantity of acetic acid (containing the remainder of acetic anhydride) had been collected by the end of this phase.

The light brown products obtained were ground and subjected to a solid phase after-condensation at 250° C. (at a vacuum of about 1 mbar/24 hours). An optically anisotropic melt phase was observed in the region of from 250° to 350° C.

TABLE 2

| | | |
|---|---|---|
| 2a) | 273.47 g | of p-hydroxybenzoic acid |
| | 22.63 g | of p-aminobenzoic acid |
| | 109.00 g | of hydroquinone |
| | 30.70 g | of 4,4'-dihydroxybiphenyl |
| | 191.40 g | of isophthalic acid |
| | 454.80 g | of acetic anhydride |
| | 60.8 g | of carboxylated polypropylene, molecular weight 70,000, acid number 1.5 |
| 2b) | 273.47 g | of p-hydroxybenzoic acid |
| | 22.63 g | of p-aminobenzoic acid |
| | 109.00 g | of hydroquinone |
| | 30.70 g | of 4,4'-dihydroxybiphenyl |
| | 191.40 g | of isophthalic acid |
| | 454.80 g | of acetic anhydride |
| | 136.9 g | of carboxylated polypropylene, molecular weight 70,000, acid number 1.5 |
| 2c) | 273.47 g | of p-hydroxybenzoic acid |
| | 22.63 g | of p-aminobenzoic acid |
| | 109.00 g | of hydroquinone |
| | 30.70 g | of 4,4'.dihydroxybiphenyl |
| | 191.40 g | of isophthalic acid |
| | 454.80 g | of acetic anhydride |
| | 234.7 g | of carboxylated polypropylene, molecular weight 70,000, acid number 1.5 |

EXAMPLE 3

Method of preparation of polypropylene/LC-polyester carbonate block copolymers

The substances summarized in Table 3 and 1.5 g of imidazole were weighed into a reaction vessel equipped with stirrer, column and distillation bridge.

The liberation of $CO_2$ began at a reaction temperature of 160° C. The reaction temperature was raised to 180° C. in the course of 15 minutes, kept constant for 60 minutes, raised to 220° C. and then kept constant until the evolution of $CO_2$ ceased.

The reaction mixture was heated to 250° C. and the pressure in the reactor was lowered stepwise to 30 mbar. After one hour, distillation had slowed down to such an extent that the reaction temperature could be raised to 275° C. and subsequently to 300° C. when the liberation of phenol had been substantially completed, the pressure in the reactor was reduced to 0.2 mbar. The reaction was completed after one hour under these condensation conditions.

The light brown products obtained were ground and subjected to a solid phase condensation at 250° C. (at a vacuum of 1 mbar/24 hours). An optically anisotropic melt phase was observed in the region of from 250° to 250° C.

TABLE 3

| | | |
|---|---|---|
| 3a) | 305.00 g | of hydroxybenzoic acid |
| | 112.60 g | of hydroquinone |
| | 31.60 g | of 4,4'-dihydroxybiphenyl |
| | 28.20 g | of isophthalic acid |
| | 779.60 g | of diphenylcarbonate |
| | 52.03 g | of the phenyl ester of polypropylene carboxylic acid |
| | 1.5 g | of imidazole |
| 3b) | 112.94 g | of hydroquinone |
| | 117.07 g | of the phenyl ester of polypropylene carboxylic acid |
| | 305.00 g | of hydroxybenzoic acid |
| | 31.60 g | of 4,4'-dihydroxybiphenyl |
| | 28.20 g | of isophthalic acid |
| | 779.60 g | of diphenylcarbonate |
| | 1.5 g | of imidazole |
| 3c) | 113.38 g | of hydroquinone |
| | 200.68 g | of the phenyl ester of polypropylene carboxylic acid |
| | 305.00 g | of hydroxybenzoic acid |
| | 31.60 g | of 4,4'-dihydroxybiphenyl |
| | 28.20 g | of isophthalic acid |
| | 779.60 g | of diphenylcarbonate |
| | 1.5 g | of imidazole |
| 3d) | 114.81 g | of hydroquinone |
| | 468.24 g | of the phenyl ester of polypropylene carboxylic acid |
| | 305.00 g | of hydroxybenzoic acid |
| | 31.60 g | of 4,4'-dihydroxybiphenyl |
| | 28.20 g | of isophthalic acid |
| | 779.60 g | of diphenylcarbonate |
| | 1.5 g | of imidazole |
| 3e) | 118.14 g | of hydroquinone |
| | 1092.50 g | of the phenyl ester of polypropylene carboxylic acid |
| | 305.00 g | of hydroxybenzoic acid |
| | 31.60 g | of 4,4'-dihydroxybiphenyl |
| | 28.20 g | of isophthalic acid |
| | 779.60 g | of diphenylcarbonate |
| | 1.5 g | of imidazole |

EXAMPLE 4

Method of preparation of PP/LC-polyester carbonate block polymers by solvent-free transesterification in an extruder 4.0 kg of a LC-polyester carbonate corresponding to the basic composition from Example 3b) and 1.0 kg of the phenyl ester of polypropylene carboxylic acid are compounded at 330° C. in a ZSK 32 (double shaft extruder with evaporator dome).

The product is drawn off as a strand, cooled in a water bath (1 to 3 m) and granulated.

Polypropylene and the phenyl esters of carboxylated polypropylenes are readily soluble in apolar solvents such as hot toluene or xylene, in contrast to the LC polymers. To examine the chemical coupling of these incompatible blocks with each other, the products were finely ground and extracted with hot xylene for 48 hours to remove PP blocks which had not been chemically coupled. Only small quantities (about 0.5%) of polypropylene which had not been carboxylated could be extracted as by-product from the carboxylation products.

The degree of coupling of the PP blocks was greater than 99% in all cases. Some important thermal properties of selected products are summarized in Table 5.

EXAMPLE 5

(Comparison Example)

4 g of a polyester carbonate corresponding to the basic composition from Example 3b) and 1 kg of commercial polypropylene are compounded as in Example 4 in a ZSK 32 (double shaft extruder with evaporate dome).

The product is drawn off in the form of a strand, cooled in a water bath and granulated.

EXAMPLE 6

Preparation of polystyrene/LC polyester carbonate block cocondensates

The raw materials summarized in Table 4 are reacted in accordance with the instructions given in Example 3.

TABLE 4

| | |
|---|---|
| 6a) | 314.00 g of p-hydroxybenzoic acid |
| | 716.55 g of hydroquinone |
| | 32.60 g of 4,4'-dihydroxydiphenyl |
| | 29.05 g of isophthalic acid |
| | 788.6 g of diphenyl carbonate |
| | 14.9 g of polystyrene carboxylic acid (molecular weight = 5000) |
| 6b) | 314.00 g of p-hydroxybenzoic acid |
| | 126.40 g of hydroquinone |
| | 32.60 g of 4,4'-dihydroxydiphenyl |
| | 190.8 g of isophthalic acid |
| | 807.45 g of diphenylcarbonate |
| | 14.9 g of polystyrene dicarboxylic acid (molecular weight 1000) |
| 6c) | 314.00 g of p-hydroxybenzoic acid |
| | 116.55 g of hydroquinone |
| | 32.60 g of 4,4'-dihydroxydiphenyl |
| | 29.05 g of isophthalic acid |
| | 788.6 g of diphenylcarbonate |
| | 14.9 g of polystyrene dicarboxylic acid (molecular weight = 10,000) |

Polystyrene and the phenyl esters of the carboxylated polystyrenes are readily soluble in hot xylene, in contrast to the LC polymers.

To test for chemical coupling, the PS/LC block cocondensates were finely ground and extracted with hot xylene for 48 hours to dissolve out any polystyrene blocks which were not chemically bound. Only small proportions (about 0.3 to 0.5%) of polystyrene which had not been carboxylated and had been present as by-product in the starting materials could be extracted.

TABLE 5

| Product | Tg (°C.) | ΔHU (J/g) | Tu (°C.) |
|---|---|---|---|
| PP/LC polyester block cocondensates | | | |
| 1a | 121 | 6.1/4.3 | 148.9/287.5 |
| 1b | 123 | 10.7/4.0 | 148.2/289.3 |
| 1c | 119 | 35/3.8 | 149.4/287.8 |
| PP/LC polyester amide block cocondensates | | | |
| 2a | 129 | 6.2/4.6 | 149.1/304.6 |
| 2b | 128 | 11.7/4.3 | 147.1/305.1 |
| 2c | 131 | 34.3/4.5 | 150.0/302.1 |

TABLE 5-continued

| Product | Tg (°C.) | ΔHU (J/g) | Tu (°C.) |
|---|---|---|---|
| PP/LC polyester carbonate block cocondensates | | | |
| 3a | 93 | 10.1/8.9 | 148.3/225.8 |
| 3b | 90 | 18.4/10.3 | 148.6/225.7 |
| 3c | 95 | 37.1/9.8 | 149.1/224.9 |

The phase conversion of the polypropylene blocks takes place in the temperature range of from 140° to 150° C.; that of the LC blocks is found to occur at higher temperatures:

| | |
|---|---|
| LC-polyester | 288° C. |
| LC-polyester amide | 304° C. |
| LC-polyester carbonate | 225° C. |

The mechanical properties of some selected products are summarized in Table 6. It is noticeable that at high LC block contents, the properties of the LC phase dominate. At PP block contents of upwards of about 20–30%, the properties gradually change in the direction of those of pure polypropylene.

TABLE 6

| Product | $a_n/a_k$ | R | $E_Z$ | B | $E_B$ | HDT-A |
|---|---|---|---|---|---|---|
| 1b | 24/20 | 104 | 12,700 | 110 | 7,800 | 125 |
| 2b | 33/18 | 130 | 11,200 | 175 | 10,300 | 138 |
| 3a | 43/35 | 136 | 11,700 | 110 | 8,200 | 148 |
| 3b | 44/30 | 147 | 10,600 | 102 | 7,500 | 142 |
| 3c | 25/20 | 100 | 6,400 | 75 | 3,220 | 125 |
| 4 | 35/30 | 140 | 10,000 | 100 | 7,600 | 138 |
| 5 | 4/4 | 35 | 2,000 | 22 | 2,530 | 90 |

$a_n/a_k$: Impact strength and notched impact strength (kJ/m$^2$)
R: Tear resistance (MPa)
$E_Z$: Tension-E modulus (MPa)
B: Flexural strength (MPa)
$E_B$: Flexural-E-modulus (MPa)

We claim:

1. Thermoplastic moulding compounds of
    A) polypropylene containing carboxyl or carboxylic acid ester anhydride groups and
    B) fully aromatic polyesters, polyester carbonates or polyamides as liquid crystalline polymers, wherein components A) and B) are polymer blocks covalently linked by ester or amide groups.

2. Thermoplastic moulding compounds according to claim 1 wherein component B) is a fully aromatic polyester.

3. Thermoplastic moulding compounds according to claim 1 wherein component A) is polypropylene and component B) is a fully aromatic polyester covalently lined by ester groups.

* * * * *